(12) United States Patent
Campbell

(10) Patent No.: US 9,186,867 B2
(45) Date of Patent: Nov. 17, 2015

(54) ASSEMBLY INCLUDING A REINFORCED COMPOSITE PART WITH A PRE-FORMED RIVET RECEIVING BUTTON

(71) Applicant: Ford Global Technologies, LLC, Dearborn, MI (US)

(72) Inventor: Aindrea McKelvey Campbell, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/452,973

(22) Filed: Aug. 6, 2014

(65) Prior Publication Data

US 2014/0349066 A1    Nov. 27, 2014

Related U.S. Application Data

(62) Division of application No. 13/768,517, filed on Feb. 15, 2013, now Pat. No. 8,826,510.

(51) Int. Cl.
*B32B 7/08* (2006.01)
*B32B 3/26* (2006.01)
*B32B 3/30* (2006.01)

(52) U.S. Cl.
CPC . *B32B 7/08* (2013.01); *B32B 3/266* (2013.01); *B32B 3/30* (2013.01); *Y10T 29/49938* (2015.01); *Y10T 29/49956* (2015.01); *Y10T 428/24322* (2015.01); *Y10T 428/24479* (2015.01)

(58) Field of Classification Search
CPC .............. B23B 7/04; B23B 7/08; B23B 3/30; B23B 3/26; B21J 15/02; B21J 15/025; B21J 15/142; F16B 5/04; F16B 5/0607; F16B 17/002; F16B 19/086

USPC ........ 29/419.1, 505, 521, 522.1, 524, 525.05, 29/525.06, 525.07, 243.53, 243.57
See application file for complete search history.

(56) References Cited

U.S. PATENT DOCUMENTS

| 2,845,699 | A | * | 8/1958 | Woodard | 29/419.1 |
| 3,053,713 | A | * | 9/1962 | Appy | 428/608 |
| 3,125,974 | A | * | 3/1964 | Toulman, Jr. | 72/483 |
| 3,429,766 | A | * | 2/1969 | Stormfeltz | 428/37 |
| 4,327,536 | A | | 5/1982 | Ascher | |
| 4,863,771 | A | * | 9/1989 | Freeman | 428/36.1 |
| 4,894,102 | A | * | 1/1990 | Halls et al. | 156/94 |

(Continued)

FOREIGN PATENT DOCUMENTS

| CN | 101510478 | 8/2009 |
| EP | 23359955 | 8/2011 |

OTHER PUBLICATIONS

Dogma Cluster 1: Joining Techniques, Jan. 31, 2001.

(Continued)

*Primary Examiner* — Christopher M Koehler
(74) *Attorney, Agent, or Firm* — Raymond L. Coppiellie; Brooks Kushman P.C.

(57) ABSTRACT

A composite part defining a button shaped protrusion and including fibers reinforcing a resin matrix throughout the part. The fibers may be in the form of a woven mat or in the form of loose fibers that are deposited in a mold. Methods of making the composite part with a woven mat or loose fibers being provided in the button shaped recess that defines a void in the fiber reinforced composite part at a predetermined location where a self-piercing rivet is to be inserted.

9 Claims, 1 Drawing Sheet

(56) References Cited

U.S. PATENT DOCUMENTS

| | | | |
|---|---|---|---|
| 5,106,147 | A | 4/1992 | Okada et al. |
| 5,121,537 | A * | 6/1992 | Matsui et al. ............... 29/522.1 |
| 5,139,405 | A * | 8/1992 | Krone et al. ................ 425/116 |
| 5,151,322 | A * | 9/1992 | Kimoto et al. ............ 428/299.1 |
| 5,192,330 | A * | 3/1993 | Chang et al. ............ 623/23.34 |
| 5,359,765 | A | 11/1994 | Auriol et al. |
| 5,882,462 | A * | 3/1999 | Donecker et al. ............. 156/205 |
| 5,884,386 | A * | 3/1999 | Blacket et al. ............... 29/522.1 |
| 5,984,055 | A * | 11/1999 | Strasser et al. ........... 188/251 A |
| 7,252,469 | B2 | 8/2007 | Zaluzec et al. |
| 7,284,319 | B2 | 10/2007 | Kato et al. |
| 7,849,573 | B2 | 12/2010 | Saathoff, Sr. |
| 2001/0039710 | A1* | 11/2001 | Nakao et al. .................... 29/417 |
| 2003/0110727 | A1 | 6/2003 | Gregori |
| 2004/0134573 | A1 | 7/2004 | Joaquin et al. |
| 2005/0022362 | A1* | 2/2005 | Chen .............................. 29/521 |
| 2005/0086799 | A1* | 4/2005 | Kato et al. ...................... 29/798 |
| 2005/0266221 | A1 | 12/2005 | Karam et al. |
| 2006/0068215 | A2 | 3/2006 | Dolinar |
| 2008/0072527 | A1* | 3/2008 | Kondo et al. ................. 52/729.1 |
| 2009/0068399 | A1* | 3/2009 | Murakami et al. ............. 428/133 |
| 2009/0091159 | A1* | 4/2009 | Gerish ..................... 296/193.07 |
| 2009/0126180 | A1 | 5/2009 | Keener |
| 2009/0188101 | A1 | 7/2009 | Durandet et al. |
| 2010/0083481 | A1 | 4/2010 | Luo et al. |
| 2011/0126396 | A1 | 6/2011 | Clarke et al. |
| 2011/0170983 | A1 | 7/2011 | Day et al. |
| 2011/0173844 | A1* | 7/2011 | Samuels et al. ................. 36/122 |
| 2011/0314765 | A1 | 12/2011 | Martel |

OTHER PUBLICATIONS

Livon Fratini et al., Self-Piercing Riveting for Aluminum Alloys-Composites Hybrid Joints, May 12, 2008.

* cited by examiner

ASSEMBLY INCLUDING A REINFORCED
COMPOSITE PART WITH A PRE-FORMED
RIVET RECEIVING BUTTON

CROSS-REFERENCE TO RELATED
APPLICATION

This application is a division of U.S. application Ser. No. 13/768,517, now U.S. Pat. No. 8,826,510, filed Feb. 15, 2013, the disclosure of which is hereby incorporated in its entirety by reference herein.

TECHNICAL FIELD

This disclosure relates to reinforced composite parts and methods of making reinforced composite part assemblies.

BACKGROUND

As the automotive industry continues to focus on reducing the weight of vehicles to meet customer expectations on fuel economy and CAFE requirements, interest in alternative materials including carbon fiber composite applications has increased. In body-in-white structures, joining methods have traditionally relied on resistance-spot welding (e.g., in steel structures).

In the case of aluminum intensive vehicles and other mixed metal joining applications, self-piercing rivet technology prevails. One advantage of self-piercing rivet technology is that it is a high production volume assembly process. Self-piercing rivet technology is compatible with adhesive and both methods can be used together. The challenge often faced with self-piercing rivet technology, however, is that the substrate material must be ductile enough to form a "button", i.e., protrusion, which is the result of creating the joint and the necessary deformation to provide mechanical interlock. When composite parts do not have sufficient ductility to form a button on the obverse side, fibers may be exposed through cracks in this surface. Surface cracking and fiber displacement are undesirable, as they may reduce the durability of the joint and result in premature failure. With a self-piercing rivet, fibers in the area where the rivet is inserted may result in surface cracking or fiber displacement.

Composite materials, such as carbon fiber, glass fiber or natural fiber composites, can be limited in application due to challenges relating to joining parts together. Frequently, these composites have limited ductility and are not well adapted to large displacements and deformation required to join parts together with self-piercing rivets.

Adhesives are used extensively to join composite parts together. Adhesive joining is a lower volume production method when used in isolation and is susceptible to displacement (i.e., movement between the parts to be joined) until the glue is cured.

Other methods, such as blind rivets, may be used to fasten parts to a composite component but it is necessary to first drill or pre-form a hole through the parts to insert the blind rivet. Assembly operations for drilling holes, aligning the holes, inserting the blind rivet and affixing the rivet add to the cost of assembly and the cost of tooling. A joining solution is needed that meets high volume production requirements and enables joining in a low ductility material.

This disclosure is directed to overcoming the above problems and other problems associated with the use of composite parts in applications where other parts are joined to a composite part.

SUMMARY

According to one aspect of this disclosure, a pre-formed part is disclosed that comprises a composite member including a resin matrix and reinforcement fibers in a predetermined location for receiving a self-piercing rivet. A button shaped area formed in the composite member defines a void at the predetermined location.

According to other aspects of this disclosure as it relates to a pre-formed part, the reinforcement fibers reinforcing the resin matrix may further comprise a woven mat provided in the predetermined location. Alternatively, the reinforcement fibers reinforcing the resin matrix may further comprise loose fibers that are dispersed throughout the resin matrix including in the predetermined location.

The pre-formed part may be provided in combination with an assembled part that is assembled to the pre-formed part. A self-piercing rivet is inserted through the assembled part and through the pre-formed part. Displaced material in the void between the self-piercing rivet and the pre-formed part locks the assembled part to the button shaped area of the pre-formed part.

According to another aspect of this disclosure, a method of making a fiber reinforced composite part is disclosed that comprises providing a fiber mat and inserting the fiber mat into a mold that defines a mold cavity including a button shaped recess. A liquid resin is supplied to the mold that envelopes the fiber mat. The resin is hardened in the mold and the resin in the button shaped recess defines a void in the fiber reinforced composite part at a predetermined location where a self-piercing rivet is to be inserted.

According to another aspect of this disclosure, an alternate method is disclosed for making a fiber reinforced composite part. The alternate method comprises providing a plurality of loose fibers into a mold that defines a mold cavity including a button shaped recess. A liquid resin is supplied to the mold that envelopes the loose fibers. The resin is hardened in the mold and the resin in the button shaped recess defines a void in the fiber reinforced composite part at a predetermined location where a self-piercing rivet is to be inserted.

According to other aspects of the above methods, the methods may further comprise assembling a second part to the fiber reinforced composite part, and riveting the fiber reinforced composite part and the second part together at the predetermined location. The step of riveting the fiber reinforced composite part and the second part may further comprise driving a self-piercing rivet through the second part in a fastener receptacle area in the fiber reinforced composite part. Material is displaced from the second part into the void in fiber reinforced composite part to lock the second part and fiber reinforced composite part together in the predetermined location.

According to another aspect of this disclosure, an alternate method is disclosed for making a fiber reinforced composite part. The alternate method comprises providing a plurality of loose fibers into a mold that defines a mold cavity including a button shaped recess. A liquid resin is supplied to the mold that envelopes the loose fibers. The resin is hardened in the mold and the resin in the button shaped recess defines a void in the fiber reinforced composite part at a predetermined location where a self-piercing rivet is to be inserted.

The above aspects of this disclosure as summarized above and other aspects will be more fully described below with reference to the attached drawings of the illustrated embodiments.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
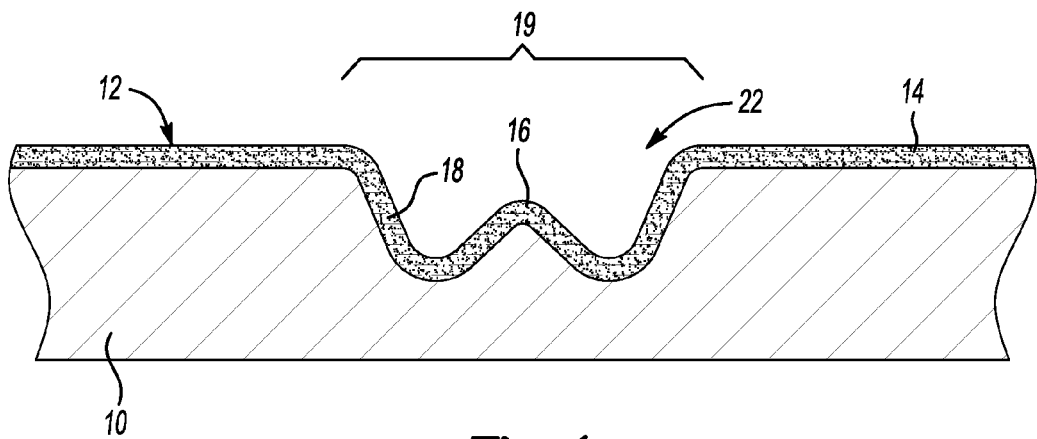
FIG. 1 is a fragmentary cross-sectional view of a fiber reinforced composite part in a mold that has a button shaped protrusion formed on one side of the part.

Referring to FIG. 1, a mold 10 is illustrated for forming a fiber reinforced composite part 12. The fiber reinforced composite part 12 is shown to include fibers 14 that are indicated by dashed lines within the part and is shown to include resin 16 by dotted stippling. A button shaped protrusion 18, or "button," is formed in a predetermined location 19 where a self-piercing rivet 20 (shown in FIG. 2) is planned to be inserted into the fiber reinforced composite part 12. The button 18 may be formed by placing loose fibers 14, or a mat of fibers, into the mold cavity 22 and depositing resin 16 in the mold cavity 22 and on other parts of the mold 10 to form the fiber reinforced composite part 12 including the button 18.

Figure 2:
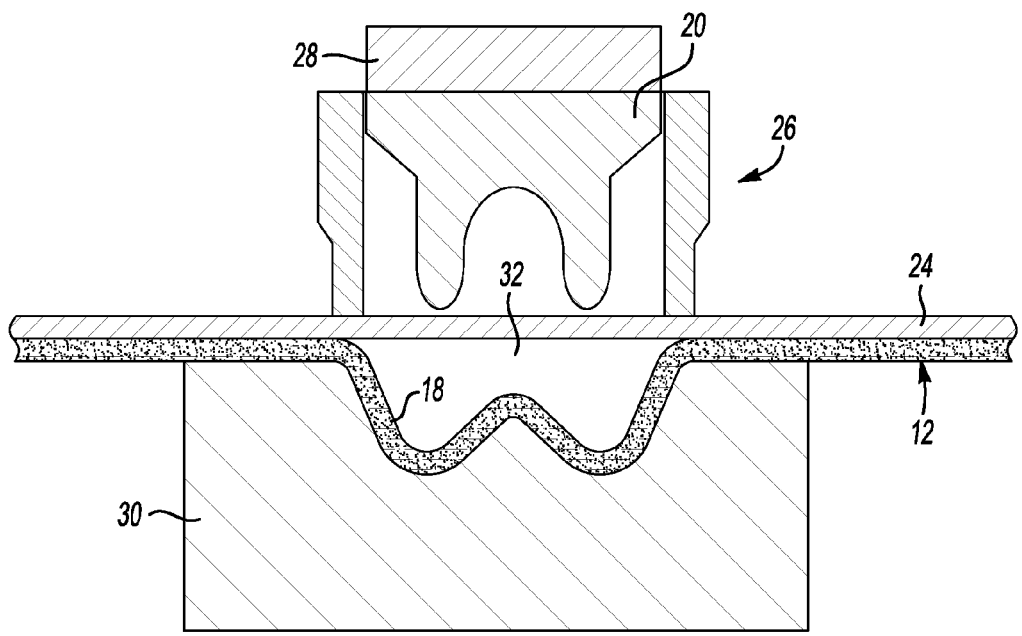
FIG. 2 is a fragmentary cross-sectional view of a metal panel and a fiber reinforced composite part with a self-piercing rivet tool including a riveter punch and a back-up die with a self-piercing rivet in position to be driven into the parts.

Referring to FIG. 2, a second part 24 is shown assembled over the fiber reinforced composite part 12 in a self-piercing rivet tool 26. The self-piercing rivet tool 26 includes a riveter punch 28 and a back-up die 30. The second part 24 may be made of steel, aluminum or other metals. Alternatively, the second part 24 may be made of a fiber reinforced composite material. A void 32 is defined between button 18 in the fiber reinforced composite part 12 and the second part 24 prior to insertion of the self-piercing rivet 20 into the parts 12, 24.

Figure 3:
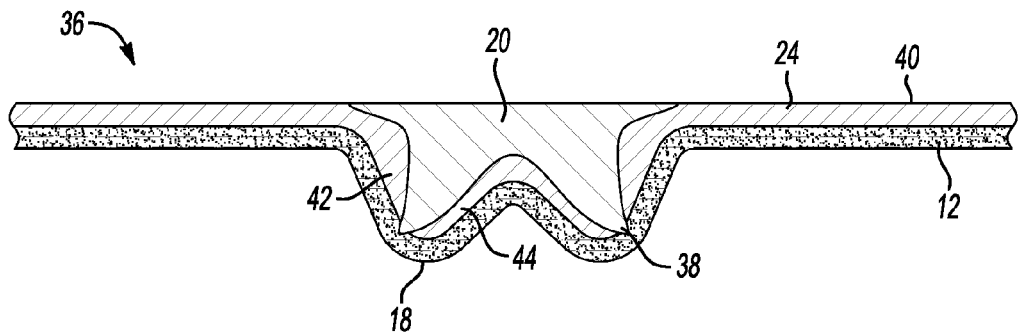
FIG. 3 is a cross-sectional view of the part assembled to the fiber reinforced composite part with the self-piercing rivet fastening the parts together.

Referring to FIG. 3, an assembly 36 is illustrated that includes the fiber reinforced composite part 12 and the second part 24 that are secured together with the self-piercing rivet 20. The self-piercing rivet 20 has an insertion end 38 that is inserted through a top side 40 (as viewed in FIG. 3) of the second part 24 and the fiber reinforced composite part 12. It should be understood that the reference to a top side is not limiting and that the parts may be arranged in any orientation. The insertion end 38 of the self-piercing rivet 20 is spread apart as the self-piercing rivet is driven through the second part 24. Material from the second part 24 is formed into the location corresponding to the void 32 (as shown in FIG. 2). Radially displaced material 42 fills in between the side of the self-piercing rivet 20 and the button 18 formed on the fiber reinforced composite part 12. Axially displaced material 44 fills in between the insertion end of the self-piercing rivet 20 and the button formed on the fiber reinforced composite part 12.

The self-piercing rivet 20 penetrates the fiber reinforced composite part 12 to create a mechanical interlock, thereby joining the two parts together. The pre-formed button 18 and void 32 receive the displaced material 42, 44 and reduce the force exerted on fiber reinforced composite part 12 in the area of the pre-formed button 18. By pre-forming the button, any tendency for the button to crack or split and expose fibers 14 is substantially reduced.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A pre-formed part in combination with an assembled part that is assembled to the pre-formed part, the combination comprising:
    a composite member including a resin matrix and reinforcement fibers having a pre-formed button shaped area that defines a void at a predetermined location;
    a self-piercing rivet extending completely through the assembled part at the predetermined location and having an insertion end penetrating into a portion of the composite member such that the insertion end directly contacts a portion of the composite member at the button shaped area; and
    displaced material from the assembled part disposed in the void between the self-piercing rivet and the button-shaped area that locks the assembled part to the button-shaped area of the pre-formed part without cracks in the pre-formed part that expose the fibers.

2. The pre-formed part of claim 1 wherein the reinforcement fibers reinforcing the resin matrix further comprise a woven mat provided in the predetermined location.

3. The pre-formed part of claim 1 wherein the reinforcement fibers reinforcing the resin matrix further comprise loose fibers that are dispersed throughout the resin matrix including in the predetermined location.

4. An assembly comprising:
    a first part including a resin matrix and reinforcement fibers, the first part having a pre-formed button-shaped recess on a first side and a pre-formed button-shaped protrusion on a second side;
    a second part assembled over the button-shaped recess; and
    a self-piercing rivet inserted through the second part that displaces displaced material from the second part into the button-shaped recess without deforming the button-shaped protrusion on the second side, wherein an insertion end of the self-piercing rivet extends completely through the second part and penetrates into the first part at the button-shaped protrusion such that the insertion end directly contacts the first part.

5. The assembly of claim 4 wherein the reinforcement fibers further comprise a woven mat.

6. The assembly of claim 4 wherein the reinforcement fibers further comprise loose fibers that are dispersed throughout the resin matrix.

7. The assembly of claim 4 wherein the displaced material locks the second part into the button shaped recess of the first part.

8. An assembly comprising:
    a first part including a resin matrix and reinforcement fibers, a pre-formed button-shaped recess, and a pre-formed button-shaped protrusion;
    a second part assembled over the button-shaped recess; and a self-piercing rivet inserted completely through the second part that displaces displaced material from the second part into the button-shaped recess without deforming the button-shaped protrusion, wherein an insertion end of the self-piercing rivet penetrates into, and directly contacts, the first part.

9. The assembly of claim 8 wherein the displaced material locks the second part into the button shaped recess of the first part.

\* \* \* \* \*